United States Patent [19]

Mahapatra et al.

[11] Patent Number: 4,695,121

[45] Date of Patent: Sep. 22, 1987

[54] INTEGRATED OPTIC RESONANT STRUCTRES AND FABRICATION METHOD

[75] Inventors: Amaresh Mahapatra, Lexington; Donald H. McMahon, Carlisle; William C. Robinson, Concord; Norman A. Sanford, Stillriver, all of Mass.

[73] Assignee: Polaroid Corporation, Cambridge, Mass.

[21] Appl. No.: 695,467

[22] Filed: Jan. 28, 1985

[51] Int. Cl.[4] .............................................. G02B 6/12
[52] U.S. Cl. ................................ 350/96.12; 437/173; 350/96.15
[58] Field of Search ............... 350/96.11, 96.12, 96.13, 350/96.14, 96.15; 148/186, 187, 188, 900, 903

[56] References Cited

U.S. PATENT DOCUMENTS

| | | | |
|---|---|---|---|
| 3,406,358 | 10/1968 | Seidel et al. | 333/71 |
| 3,558,213 | 1/1971 | Marcatili | 350/96 |
| 3,589,794 | 6/1971 | Marcatili | 350/96 |
| 4,002,997 | 1/1977 | Thompson | 350/96.11 X |
| 4,112,389 | 9/1978 | Streifer | 331/94.5 |
| 4,196,963 | 4/1980 | Chen et al. | 350/96.12 |
| 4,469,397 | 9/1984 | Shaw et al. | 350/96.15 |
| 4,630,885 | 12/1986 | Haavisto | 350/96.15 |

OTHER PUBLICATIONS

Jackel, J. L. et al., "Proton Exchange for High-Index Waveguides in LiNbO$_3$", Apply. Phys. Lett. 41(7), pp. 607-608, 10-1-82.
Spillman, W. B. et al, "Optical Waveguides in LiTaO$_3$ Formed by Proton Exchange", Optics Lett., vol. 8, No. 9, pp. 497-498, 9-1983.
DeMicheli et al., "Fabrication and Characterization of . . . in Lithium Niobate", *Optics Communications*, vol. 42, No. 2, Jun. 1982, pp. 101-103.
Goodwin et al, "Proton-Exchanged Optical Waveguides in Y-Cut Lithium Niobate", *Electronics Lett.*, vol. 19, No. 6, Mar. 1983, pp. 223-225.
Papuchon et al, "Integrated Optical Polariser on LiNbO$_3$ . . . ", *Electronics Lett.*, vol. 19, No. 16, Aug. 1983, pp. 612-613.
"Bends in Optical Dielectric Guides", By E. A. J. Marcatili, Reprinted from Bell Syst. Tech. J., vol. 48, pp. 2103-2132, Sep. 1969.
"A Thin-Film Ring Laser" by H. P. Weber and R. Ulrich, Reprinted from Appl. Phys. Lett., vol. 19, pp. 38-40, Jul. 15, 1971.
"Optical Waveguides in LiTaO$_3$, Formed by Proton Exchange", by W. B. Spillman, et al, Optics Lett., vol. 8, No. 9, Sep. 1983, pp. 497-498.
"Characteristics of an Integrated Optics Ring Resonator Fabricated in Glass", by Kazuo Honda et al., Journal of Lightwave Tech., vol. LT-2, No. 5, pp. 714-719, Oct. 1984.
"Integrated Optical Ring Resonators Made by Silver Ion-Exchange in Glass", By R. G. Walker and C. D. W. Wilinson, Applied Optics, vol. 22, No. 7, pp. 1029-1035, 1 Apr. 1983.
"Tunable Integrated Optical Ringresonator", K. H. Tietgen, Technical Digest, 7th Topical Meeting on Integrated and Guided Wave Optics, Apr., 1984, Kissimee, Fla.

*Primary Examiner*—John Lee
*Attorney, Agent, or Firm*—Francis J. Caufield

[57] ABSTRACT

Integrated optic resonant structures for use in optical communications and sensing applications requiring control or detection of electromagnetic radiation in the optical region of the spectrum. Preferably of planar form, the structures comprise a substrate made of a ferroelectric crystalline material in which there is formed by selectively exchanging protons for an ionic constituent of the substrate at least one optically continuous waveguiding region having predetermined resonant characteristics. At least one other waveguiding region is similarly formed in the substrate to optically couple with the resonant region and includes at least one port by which radiation can be coupled in and out of the substrate. The substrate material is preferably lithium niobate (LiNbO$_3$) or lithium tantalate (LiTaO$_3$) in which lithium ions are selectively exchanged for protons supplied by diffusion from a hydrogen rich acid. Applications for the structures include use as a band pass or reject filter, bus tap, sensor, or modulator.

20 Claims, 9 Drawing Figures

INTEGRATED OPTIC RESONANT STRUCTRES AND FABRICATION METHOD

BACKGROUND OF THE INVENTION

This invention in general relates to optical communications and in particular to resonant structures useful as components for a variety of applications in optical communication systems and, as well, for sensing applications.

Structures resonant in the optical region of the spectrum are well-known in the art having been disclosed in both fiber and integrated optics formats. Known applications for these structures include their use as rotation sensors in gyroscopes, spectrum analyzers, and optical filters.

Whether in fiber or integrated format, a resonant structure includes a waveguide in the form of a continuous optical path, which may be closed ring, and some means for coupling energy in and out of that path. When used for filtering applications, the two most important characteristics for such structures are their free spectral range and finesse.

Free spectral range refers to the frequency difference between adjacent resonant orders of the structure. In fiber optic communication systems, where such structures are to be used as filters that allow optical signals to be placed on the bus without deliteriously affecting the transmission of other wavelength signals travelling by the filter on the bus or as filters that extract a selected wavelength from the bus while allowing other wavelengths to pass by the filter with low attenuation, the capacity of such filters, referred to as bus tap ins or offs, is equal to the free spectral range of the resonant structure. That is, signals travelling on the bus at frequencies equal to each other within the free spectral range cannot be separated from one another using this type of filter. Both will either pass by the resonator or enter the resonator, depending on whether the resonator is not tuned or is tuned to one of the pair. Therefore, a large free spectral range is desirable as a means for providing a high channel capacity through a wavelength multiplexed communication bus.

Finesse measures the ratio of the free spectral range to the half-height optical signal bandpass of the resonant structure. Bandpass, in turn, indicates the capacity of the single channel of a communication link. For example, a suppressed carrier, single sideband signal having a capacity of transmitting N data bits per second requires a bandpass of approximately N Hz. Thus, the useful channel capacity is equal to the bandpass of the resonator and is calculated from the free spectral range and finesse of the resonator. If, for example, the resonator has a free spectral range of 10 Gz and a finesse of 100, then the resonator channel bandwidth is 100 MHz and a signal of at most this bandwidth may pass through the resonator.

Finesse also provides a measure of the signal to cross-talk ratio of an optical wavelength multiplexed system using resonant structures as bus tap filters. For relatively high finesse resonators (greater than 10), the strength of a signal passed through a ring resonator filter at resonance is larger, by a factor approximately equal to the square of the finesse, than the signal passed through when tuned midway between resonances. Moreover, if a communication link carries simultaneously a number of signals, separated by equal amounts in frequency equal to the value of the finesse, then the fully populated link signal to cross-talk ratio is substantially equal to the finesse.

Based on these considerations, it is clearly desirable to construct resonant structures having as high as possible a value of finesse that is consistent with the desired channel capacity for an optical communication link channel.

Resonant structures in fiber form have been fabricated by forming a loop and having regions of the fiber loop adjacent its free ends optically coupled with a suitable bulk coupling means such as that shown and described in U.S. Pat. No. 4,469,397 issued to Herbert J. Shaw et al on Sept. 4, 1984 and entitled "Fiber Optic Resonator".

Integrated optic resonant structures have been fabricated utilizing photolithographic techniques known in the semiconductor industry along with ion diffusion processes involving a variety of material systems. R. G. Walker and C. D. W. Wilkinson, for example, disclosed on Apr. 1, 1983 in an article entitled "Integrated Optical Ring Resonators Made by Silver Ion-exchange in Glass" in Vol. 22, No. 7, Applied Optics, how to fabricate an integrated optic ring resonator by silver ion diffusion in soft glass, silver and sodium substituting for one another. Others have shown that lightguide structures can be fabricated on the surface of soft glass via potassium or lithium substitution of sodium.

Kazuo Honda et al have also described the structure of an integrated optic ring resonator. Their resonators, which were disclosed in the Journal of Lightwave Technology in Vol. LT-2, No. 5 in October, 1984, were multimode in nature and were characterized by relatively high loss and relatively low finesse. Because the structures disclosed support propogation of multiple modes, they are not considered to be desirable for communications purposes since the free spectral range of the resonator is in effect reduced by the presence of additional resonances within one free spectral range.

Recently, K. H. Tietgen described, at the seventh topical meeting on integrated and guided wave optics held on April 1984 in Kissimmee, Fla., the fabrication of a ring-like resonator by titanium diffusion in lithium niobate. A desirable feature of this ring is the fact that the substrate material is electro-optic.

In spite of the many innovations made in this art, improved resonant structures are still required and can be usefully employed in optical fiber communication systems for a variety of purposes. In particular, resonant structures of high finesse, large free spectral range, low susceptibility to optical damage, and tunability can be used to advantage in modulation and filtering applications and as well, in a variety of environments requiring sensors. Furthermore, ease and efficiency of manufacture and the use of electro-optic materials are important considerations. Accordingly, it is a primary object of the present invention to provide resonant structures having the above beneficial characteristics and which can be used for a variety of purposes.

Other objects of the invention will, in part, be obvious and will, in part, appear hereinafter. The invention accordingly comprises the structure and method exemplified in the detailed disclosure which follows.

SUMMARY OF THE INVENTION

This invention generally relates to optical communications and sensing and more specifically to resonant optical structures useful as components for controlling or detecting optical radiation in communications and sensing applications.

The inventive resonant structures are of integrated format and preferably of planar geometry, differing in purpose but having in common their method of fabrication, basic material system, and certain structural features. In particular, each comprises a substrate made of a ferroelectric crystalline material in which there is formed by selectively exchanging protons for an ionic constituent of the substrate at least one optically continuous waveguiding region having predetermined resonant characteristics.

At least one other waveguiding region is similarly or otherwise formed in the substrate to optically couple with the resonant waveguiding region and includes at least one port by which radiation can be coupled in and out of the substrate.

The substrate material is preferably selected from the group comprising lithium niobate (LiNbO$_3$) and lithium tantalate (LiTaO$_3$) and the resonant waveguiding regions are formed in the substrate by selectively exchanging lithium ions for protons in a diffusion process having as a proton source a hydrogen rich acid such as benzoic acid.

Photolithographic techniques are employed along with the ion exchange process to control waveguiding region patterns, index profiles and proximity.

Several examples of resonant structures that can be fabricated in this manner are disclosed and illustrate possible applications including the use of such structures as bandpass or reject filters, bus taps, sensors, and modulators.

Advantageously, the basic material is electrooptic and provides the resonant structures with such beneficial properties as polarization control, low susceptibility to optical damage, and high finesse.

BRIEF DESCRIPTION OF THE DRAWINGS

The novel features that are considered characteristic of the invention are set forth with particularity in the appended claims. The invention itself, however, both as to its organization and method of operation, together with other objects and advantages thereof, will be best understood from the following description of the illustrated embodiments when read in connection with the accompanying drawings wherein like numbers have been employed in the different figures to denote the same parts and wherein:

DETAILED DESCRIPTION

This invention in general relates to fiber optic resonant structures intended for use in optical communications and sensing applications requiring control or detection of electromagnetic radiation, preferably in the optical region of the spectrum ranging in wavelength from the ultraviolet through the near infrared. More particularly, it encompases a wide range of fiber optic resonant structures having in common certain structural features and materials which are brought together by a fabrication process that differs from one structure to another in only minor detail, but in no essential way.

Of the variety of resonant structures that it is possible to fabricate according to the teachings of the invention, exemplary embodiments to be described illustrate the major features and characteristics of the invention and emphasize that, in practicing the invention, it is possible to achieve a variety of functions with minor structural modifications to an otherwise basic structural and material system.

Figure 1:
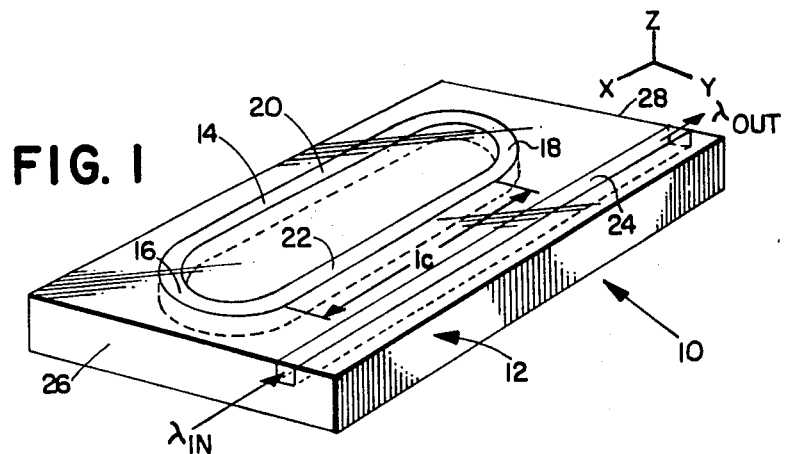
FIG. 1 is a diagrammatic perspective view of a band rejection filter representing one possible configuration for the inventive resonant structure.

The basic resonant structure of the invention, which has structural and material features shared by all of the embodiments to be described, is a band rejection filtering device designated at 10 in FIG. 1. Device 10 is of integrated optic form comprising a generally parallelepiped-shaped, thin, planar substrate 12 having formed therein in a manner to be described a continuous waveguiding region 14 which, when viewing the top of the substrate 12, appears in the shape of a racetrack with semicircular spaced-apart sections, 16 and 18, the ends of which are connected by straight sections 20 and 22. Along one straight section of the racetrack, near 22, but it can be either 20 or 22, is formed a straight waveguiding region 24 which is optically coupled with the racetrack straight section 22 in a manner to be described. The ends of the straight section 22 terminate on opposite substrate sides 26 and 28, where the ends are available to serve as a means for coupling radiation in and out of substrate 12. In FIG. 1, the radiation coupled into the substrate is generally designated as $\lambda_{in}$ and that out of the substrate as $\lambda_{out}$. In keeping with accepted nomenclature, the coupling ends of the straight waveguiding region 24 are commonly referred to as ports.

Substrate 12 is formed of a ferroelectric crystalline material having birefringent properties and is preferably of lithium niobate (LiNbO$_3$), but can also be of lithium tantalate (LiTaO$_3$), but can also material having similar properties.

The preferred crystalline orientation for the substrate 12 is indicated in FIG. 1 with the Z-axis, the optic axis, of the crystallographic X-Y-Z coordinate system perpendicular to the substrate top surface. With this orientation, it will be understood that the preferred substrate material is Z-cut.

The exact size of the substrate 12, as well as the size of the other embodiments to be described, depends on the application, function, and the number and shape of the waveguiding regions required, but, in general, will be on the scale of millimeters in length and width and perhaps a millimeter or so in depth with the radius of the semicircular waveguiding regions, 16 and 18, being as little as a fraction of a millimeter and as large as a few centimeters.

The size, proximity, and the index profile and other optical properties of the waveguiding regions 14 and 24 are selected in a well-known manner to support single mode propagation and then are formed in the substrate 12 by known photolithographic techniques in conjunction with an ion-exchange process in which protons are selectively exchanged for lithium ions in the substrate material to selectively change the index of refraction of the substrate material in one azimuth so that the radiation propagated in the waveguiding regions of the substrate is preferentially polarized parallel to the Z-axis, (T mode).

The photolithographic steps employed are the usual ones of forming a thin metal mask over the top of the substrate 12 with openings in the desired size, shape, and location of the waveguiding regions as they appear on the substrate top surface.

The top of the substrate 12, with its unprotected openings conforming to the geometry of the waveguiding regions, is immersed in a hot melt of benzoic acid ($C_6H_5COOH$) or other hydrogen rich acid such as sulfuric acid ($H_2SO_4$) with suitable precautions being taken to assure that the mask material and whatever hydrogen rich acid is used are compatible. When immersed in the benzoic acid melt, the unprotected regions of the lithium niobate or lithium tantalate substrate exchange lithium ions for free protons which are supplied by the hydrogen rich acid. The result of this is an increase in the extraordinary index of refraction. The amount of index change and the effective depth in the waveguiding channels 14 and 24 depend in a well-known manner on the acid temperature and the exposure time recognizing, of course, that diffusison proceeds in two directions and not necessarily at the same rate.

In the foregoing simple manner, the device 10 is fabricated quite easily with potolithographic techniques and an ion diffusion process to form waveguiding regions which have an index of refraction which is higher than that of the substrate material in one azimuth so that only electromagnetic waves whose polariztion azimuth is parallel to the Z-axis in FIG. 1 are propagated by the waveguiding regions.

Typical increases of extraordinary index are on the order of 0.1 and higher for both lithium niobate and lithium tantalate in comparison with the substrate base material index of refraction which for both materials is approximately 2.2. The high index of refraction difference between the waveguiding regions and the surrounding substrate material permits the waveguiding regions to have a high numerical aperture which mitigates against bending losses that would otherwise occur in the semicircular regions of small radius (16 and 18). In addition, the substrate material is electro-optic and therefore can have its properties changed in response to a properly applied electric field.

In addition, another benefit of the proton exchanged lithium niobate or lithium tantalate substrate waveguide appears to be a great reduction in its susceptibility to optical damage effects at high power levels, a phenomenon which has been widely observed for other material systems, particularly in the visible and near infrared region of the spectrum.

Figure 2:
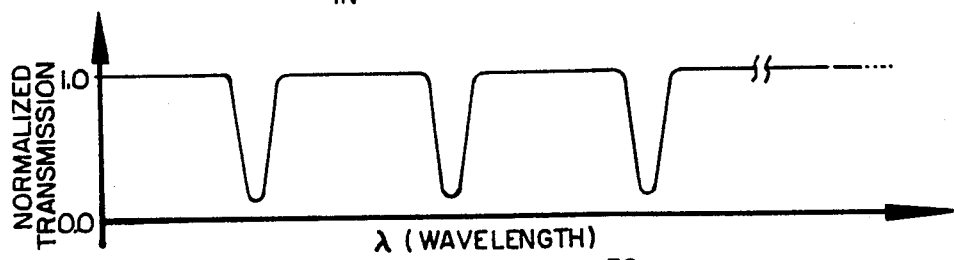
FIG. 2 is a diagrammatic graph illustrating in normalized fashion the filtering characteristics of the structure of FIG. 1.

The transfer function or normalized transmission for the device 10 is shown diagrammatically in FIG. 2 where the horizontal axis represents wavelength and the vertical axis normalized transmission, or the ratio of optical power out to power in. As can be seen from FIG. 2, the transfer function is one which shows that the device 10 periodically rejects wavelengths corresponding to adjacent resonant orders of the resonant waveguiding region 14 and which have been coupled into that region over a coupling length, $l_c$, that exists between a portion of the straight waveguiding region 24 and the straight section 22 of the optically continuous waveguiding region 14. The transfer function of FIG. 2 thus depends on the wavelength selectivity characteristics that exist over the coupling region, $l_c$, and on the resonant characteristics of the continuous waveguiding region 14, both of which may be selected in a well-known manner.

For example, the part of the device overall transfer function existing over the coupling region, $l_c$, is governed by the principles relating to evanescent coupling between waveguides and by which is understood depends on the waveguide refractive indices, wavelength, waveguide geometry, index profile, core proximity between waveguides, and coupling length, $l_c$. Thus, proper choice of coupling length, $l_c$, along with other parameters such as core separation, provides a means for achieving any degree of lateral coupling in this region and this coupling may also be made wavelength selective by control of the disperion characteristics of the two waveguiding regions. Preferably, the part of the transfer function associated with the coupling length, $l_c$, is made relatively broadband to encompass many of the resonant orders of the continuous waveguiding region 14 such that the combined transfer function of both of these waveguiding regions is the product of their respective transfer functions.

In the resonant waveguiding ring portion of the device 10, it is the physical length, call it $l_r$, of the ring (14) or continuous optical path which determines the frequency or wavelength of its resonances and is an integral number, N, of half wavelengths, i.e., $$l_r = N\lambda/n_e$$

where $\lambda$ is the free space wavelength and $n_e$ is the effective index of the ring at the resonant mode. As is known, the finesse of the ring is inversely proportional to the round trip loss for radiation propagating in the waveguide.

Assuming that the coupler itself is characterized by an amplitude coefficient, S, for coupling from the straight guide into the ring, then necessarily the amplitude transmission of the coupler for light that bypasses the ring is, C, where $C^2 + S^2 = 1$. At critical coupling, the only condition to be presented here, the light propagating around the ring suffers in a single pass as much loss due to all remaining causes, such as scattering radiation losses due to bending, etc., as due to the loss for light exiting the input coupler.

Figure 3:
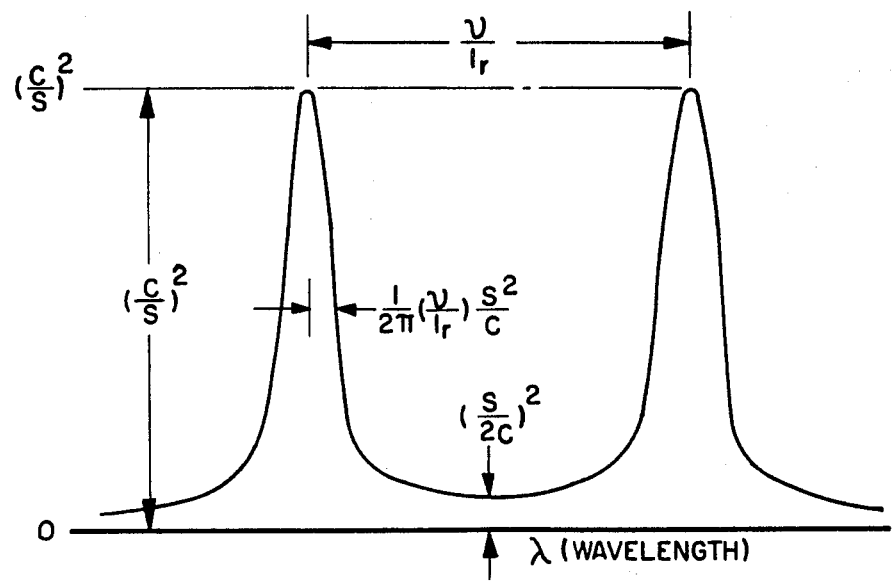
FIG. 3 is a diagrammatic graph illustrating certain relationships among the structural parameters and the field within the resonant structure of FIG. 1 at critical coupling.
Figure 4:
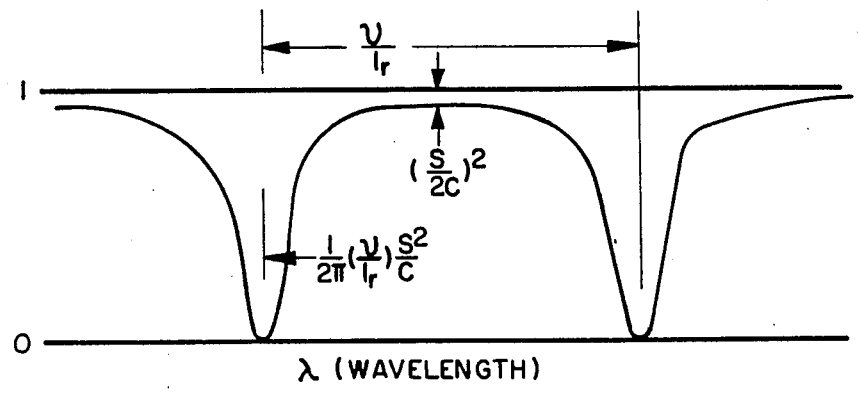
FIG. 4 is similar to FIG. 3, but gives the field appearing at the output port for the structure of FIG. 1.

It should be appreciated that the fraction of light power transferred across the coupler either way is $S^2$ on a single pass and that critical coupling assumes an equal power loss elsewhere in the ring. Under critical coupling conditions the free spectral range, the bandwidth at the half power point, and the amplitudes of the field both in the ring and midway between resonant orders are as shown in FIG. 3 where $\nu$ is equal to the speed of light. The field appearing at the output port as a function of wavelength is given in FIG. 4 for critical coupling.

Figure 5:
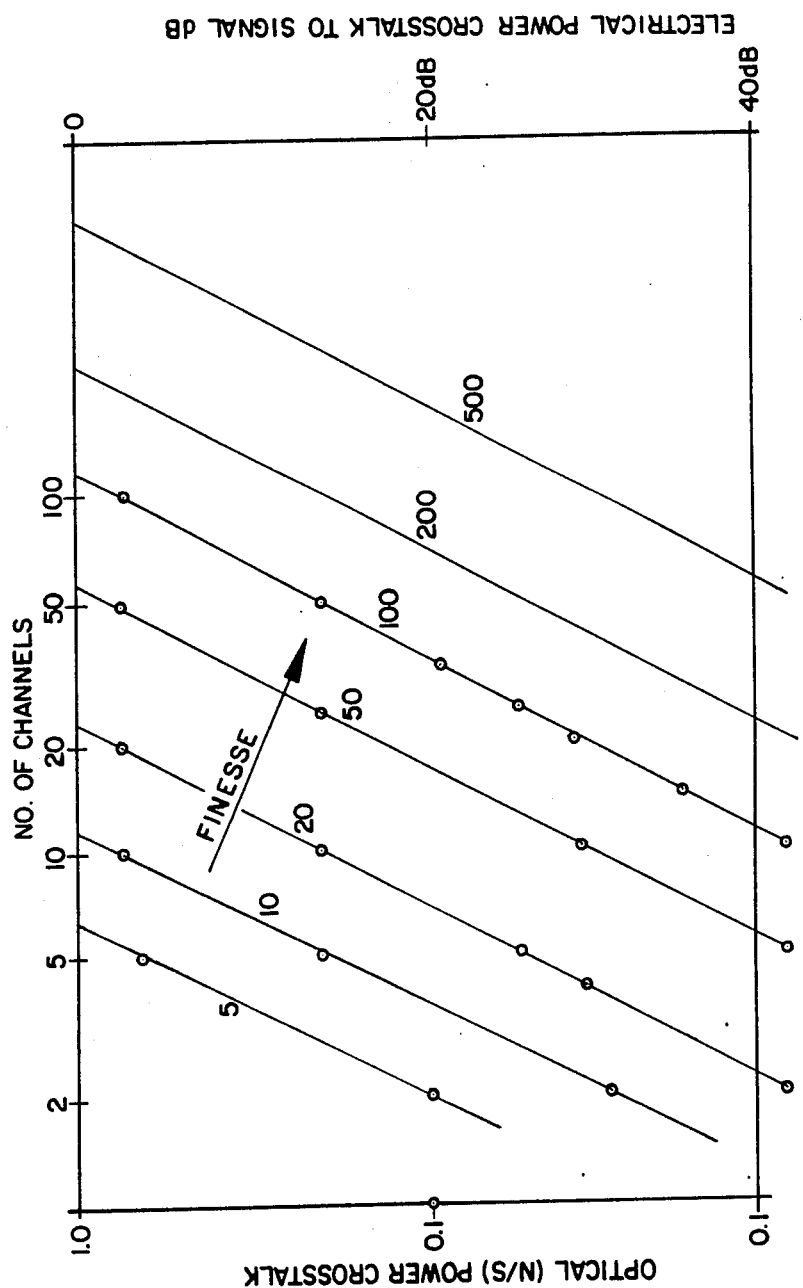
FIG. 5 is a graph illustrating the channel capacity of a communications system composed of similar resonant structures as a function of finesse and optical power crosstalk, assuming all channels are occupied.

In communications applications where it is desirable to maximize the number of channels available for carrying information, reference may be had to FIG. 5 to obtain estimates of the finesse required to obtain the desirable number of channels, assuming various levels for the optical power cross-talk ratio and a fully populated system. Clearly, as discussed previously, the number of channels increases with increasing finesse and lower optical power cross-talk, which is also a function of finesse. Devices such as 10 have been fabricated and levels of finesse of approximately 7 have been achieved using proton diffusion in lithium niobate, and it is believed that substantially higher finesses can be achieved.

Figure 6:
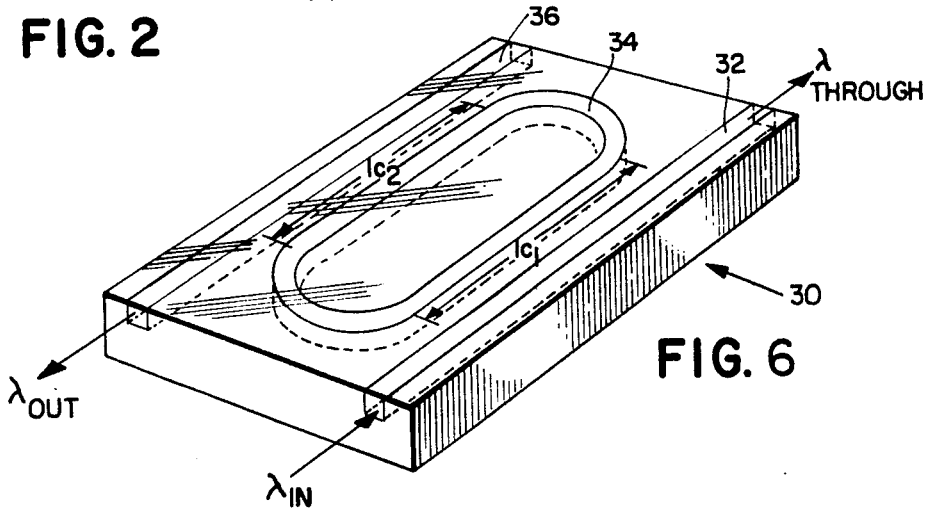
FIG. 6 is a diagrammatic perspective view of a bandpass filter representing another possible configuration of the inventive resonant structure.

By adding another straight waveguiding channel to the device 10, it is possible as shown in FIG. 6 to provide a bandpass filtering device such as that designated at 30. The device 30 is similar in structure to the device 10 having a straight waveguiding region 32, which can serve as the bus in a communication system, and a resonant ring section 34 that is laterally coupled to the bus waveguiding region 32 over the coupling length, $lc_1$. Laterally coupled to the opposite straight portion of the resonant waveguiding region 34 is another straight waveguiding region 36 that is coupled over the length, $lc_2$. In this case, the input to the device 30 is designated as $\lambda_{in}$, while the output is designated as $\lambda_{out}$. The output of the waveguiding region 32 is designated $\lambda_{through}$.

Figure 7:
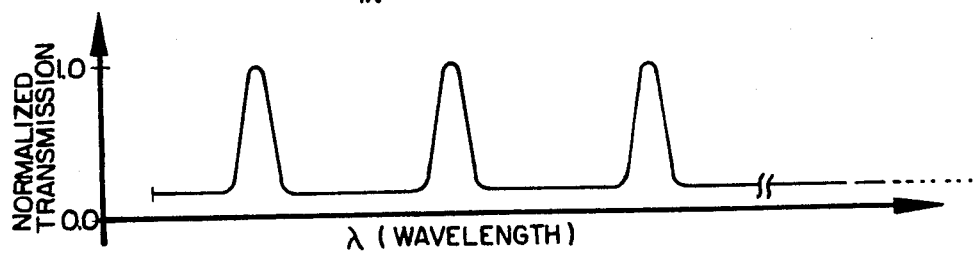
FIG. 7 is a diagrammatic graph illustrating in normalized fashion the filtering characteristics of the structure of FIG. 6.

FIG. 7 gives the normalized transfer function for the device of FIG. 6 as a function of wavelength and is seen to be the inverse of FIG. 2.

Figure 8:
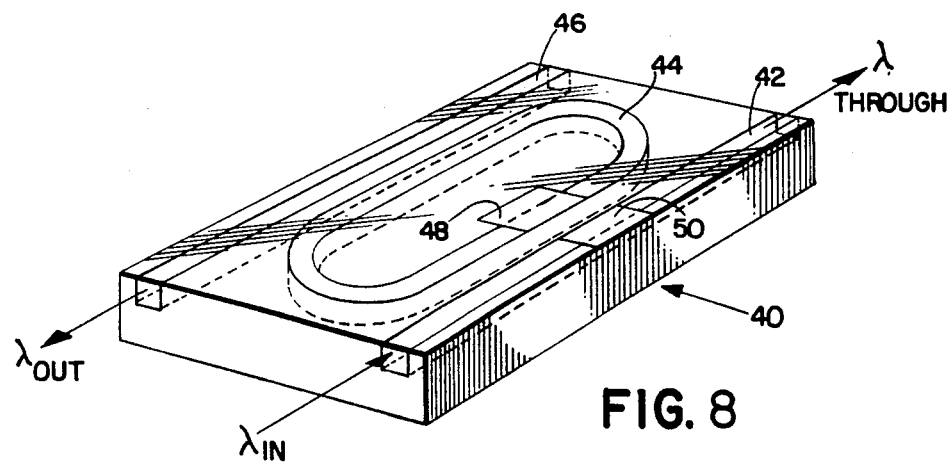
FIG. 8 is a diagrammatic perspective view of a variable bandpass filter achieved by the selective addition of electrodes to the configuration of FIG. 6.

In FIG. 8, a pair of electrodes are added to the basic device shown in FIG. 6 to obtain what may be referred to as a variable bandpass filter designated generally at 40. The device 40 comprises a substrate, again with a straight waveguiding region 42, laterally coupled as before to a straight portion of a resonant ring waveguiding region 44 which in turn is laterally coupled to another straight waveguiding region 46. The input is one of the straight waveguiding regions ends as designated before as $\lambda_{in}$ while the power exiting that waveguide is designated as $\lambda_{through}$. The output is from the remaining straight waveguiding region 46 and is designated at $\lambda_{out}$. Over the coupling region that exists between the straight portion of the resonant waveguiding region 44 and a straight section of the waveguiding region 42 are placed in a conventional manner a pair of electrodes, 48 and 50, to serve as a means for placing an electric field across a portion of the coupling region between these two waveguides. Because the substrate material of these devices is electro-optic, the presence of an electric field placed across the coupling region in this manner serves as a means for trimming up the coupling if there are variations caused by the method of fabrication or as a means for controlling the coupling anywhere from zero to 100% and particularly as a means for achieving the critical coupling condition. However, it will be recognized that in the process there will be some additional effect on the resonant characteristics of the waveguiding region 44 and this effect is not independent of variation in the coupling region.

Figure 9:
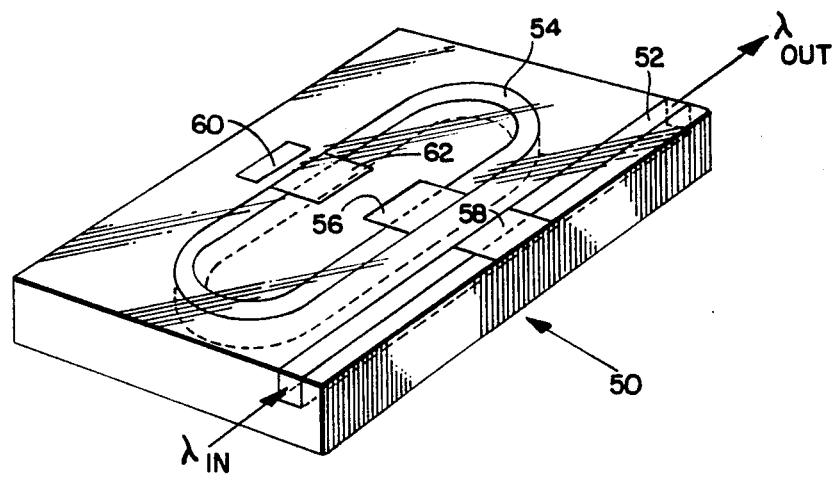
FIG. 9 is a diagrammatic perspective view of a variable bandpass filter in which signal modulation can be performed.

Another device is illustrated in FIG. 9 and it is designated generally at 50. This device has features which are similar to those described with respect to FIGS. 1 and 8. The basic waveguiding arrangement has again the use of a straight waveguiding region 52 that is laterally coupled to a resonant waveguiding region 54. Again electrodes 56 and 58 are placed within the coupling region between the straight waveguiding region 52 and the resonant waveguiding region 54 for purposes of varying or maintaining the coupling transfer function between these two waveguiding regions. Opposite these electrodes, on the other straight portion of the resonant waveguiding region 54, are two other electrodes 60 and 62. The purpose of the electrodes, 60 and 62, is to vary the resonant characteristics of the resonant waveguiding region 54 so that either the resonant wavelength or the free spectral range of the of the device 50 can be altered.

In placing the electrodes on the substrate of any of these devices, conventional techniques are used, and the electrodes are placed on a dielectric layer after the masking is removed by appropriate means. The electrodes are preferably made of chromium with either silver or gold coated over the chromium because of the good adhesion characteristics of chromium to both gold and silver and to lithium niobate or lithium tantalate.

Although the filtering characteristics of these devices has been emphasized, it is clear that they may be used for other purposes. For example, device 50 of FIG. 9 can be used as a modulator to provide a modulated signal at the output port designated as $\lambda_{out}$. And, any of the devices may be used for sensing purposes by placing an appropriate photodetector at one of their exit ports to monitor the response in a well-known way to the device's reaction to the presence of some external stimuli such as temperature or stress.

The scope of the invention encompasses the method by which these devices are fabricated and those skilled in the art may practice the invention in other ways in accordance with its teachings and still be within its scope. For example, it is perfectly within the scope of the invention to form the continuous resonant optical paths which were shown as racetrack forms in other ways. One way, for example, would be in the form of a perfect circular ring. Another would be to form the continuous optical path in the form of a loop which was optically closed, but not physically continuous, by overlapping the end regions of a ring. Moreover, it is also possible to have multiple resonant waveguiding regions which themselves are laterally coupled to one another. What is important is that the resonant waveguiding part of these devices be optically continuous so as to afford an opportunity to achieve resonance. Thus, the straight waveguiding portions of the devices may be thought of as noncontinuous portions in the sense that optical energy does not propagate around back on itself while in any other configuration for the continuous optical waveguiding portions it does. Consequently, it is intended that all matter contained in the above description or contained in the accompanying drawings shall be interpreted as illustrative and not in a limiting sense.

What is claimed is:

1. An optical resonator for use in controlling optical radiation, said resonator comprising a substrate made of a ferroelectric, Z-cut, crystalline material and having formed therein by the selective exchange of protons for at least one constituent of said substrate material a first optically continuous waveguiding region having predetermined resonant characteristics, said substrate further having formed therein a second waveguiding region having at least one port by which radiation can be coupled in and out of said substrate and at least one section optically coupled to said first optically continuous waveguiding region.

2. The resonator of claim 1 wherein said substrate material is selected from the group comprising lithium niobate (LiNbO₃) and lithium tantalate (LiTaO₃).

3. The resonator of claim 1 wherein said substrate is planar in form.

4. The resonator of claim 1 wherein said second waveguiding region comprises a substantially straight channel extending from one side to the other of said substrate.

5. The resonator of claim 1 wherein said second waveguiding region is also formed by exchanging protons for at least one constituent of said substrate ferroelectric crystalline material.

6. The resonator of claim 1 wherein said first optically continuous waveguiding region is an endless closed loop.

7. The resonator of claim 6 wherein said closed loop is noncircular.

8. The resonator of claim 1 wherein said first optically continuous waveguiding region comprises two separated parallel straight sections the ends of which are each respectively connected with a semicircular section.

9. The resonator of claim 1 further including means for forming an electric field across predetermined parts of said first and second waveguiding regions to selectively change the coupling characteristics therebetween.

10. The resonator of claim 1 further including means for forming an electric field across predetermined parts of said first waveguiding region to selectively change the resonant characteristics of said first waveguiding region.

11. The resonator of claim 1 further comprising a third waveguiding region having at least one port for coupling radiation in and out of said substrate and at least one section optically coupled to said first optically continuous waveguiding region.

12. The resonator of claim 11 further including means for selectively changing the resonant characteristics of said first waveguiding region and for changing the coupling characteristics between said second and third waveguiding regions and said first waveguiding region.

13. The resonator of claim 1 further including means for modulating radiation propagating in said first waveguiding region.

14. An optical resonator for use in controlling optical radiation, said resonator comprising a substrate made of a ferroelectric, Z-cut, crystalline material having birefringent and electro-optic properties and having formed therein a first optically continuous waveguiding region with predetermined resonant characteristics, said first waveguiding region having a higher index of refraction than that of said substrate material along one crystallographic axis thereof so that said first waveguiding region propagates only radiation polarized parallel to said crystallographic axis, said substrate having formed therein a second waveguiding region having at least one port for coupling radiation in and out of said substrate and at least one section optically coupled to said first optically continuous waveguiding region.

15. The resonator of claim 14 wherein said ferroelectric crystalline material is selected from the group comprising lithium niobate (LiNbO₃) and lithium tantalate (LiTaO₃).

16. The resonator of claim 15 wherein said first optically continuous waveguiding region of high index is formed in said substrate by exchanging a predetermined percentage of protons for lithium ions in said ferroelectric crystalline material.

17. A method for making an optical resonator for use in controlling optical radiation, said method comprising the steps of:
selectively exchanging protons with at least one constituent of a ferroelectric, Z-cut, crystalline substrate to form in said substrate an optically continuous waveguiding region having predetermined resonant characteristics; and
forming in said substrate another waveguiding region having at least one port by which radiation can be coupled in and out of said substrate and at least one region optically coupled to said optically continuous waveguiding region.

18. The method of claim 17 wherein said ferroelectric crystalline material is selected from the group comprising lithium niobate (LiNbO₃) and lithium tantalate (LiTaO₃).

19. The method of claim 17 wherein said one constituent of said ferroelectric crystalline substrate comprises lithium ions and said protons comprise hydrogen ions.

20. The method of claim 17 further including the step of masking said substrate prior to exchanging protons to define the region of said substrate over which proton exchange is to take place.

* * * * *